(12) United States Patent
Coggio et al.

(10) Patent No.: US 9,291,752 B2
(45) Date of Patent: Mar. 22, 2016

(54) RETROREFLECTING OPTICAL CONSTRUCTION

(71) Applicant: 3M INNOVATIVE PROPERTIES COMPANY, St. Paul, MN (US)

(72) Inventors: William D. Coggio, Hudson, WI (US); John S Huizinga, White Bear Lake, MN (US); Michael L. Steiner, New Richmond, WI (US); Robert F. Watkins, White Bear Lake, MN (US); Encai Hao, Woodbury, MN (US); William B. Kolb, Stillwater, MN (US); Peiwang Zhu, Woodbury, MN (US); Michael Benton Free, St. Paul, MN (US); Brant U. Kolb, Afton, MN (US); Kui Chen-Ho, Woodbury, MN (US); Paul E. Humpal, Stillwater, MN (US); Scott M. Tapio, Falcon Heights, MN (US); Kenneth L. Smith, White Bear Lake, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 213 days.

(21) Appl. No.: 13/970,260

(22) Filed: Aug. 19, 2013

(65) Prior Publication Data

US 2015/0049384 A1    Feb. 19, 2015

(51) Int. Cl.
*G02B 5/124* (2006.01)
*G02B 5/02* (2006.01)

(52) U.S. Cl.
CPC .............. *G02B 5/124* (2013.01); *G02B 5/0236* (2013.01)

(58) Field of Classification Search
CPC .......... G02B 5/124; G02B 5/128; G02B 5/12; G02B 5/126; B32B 3/00
USPC ........... 359/529–542; 428/156, 163, 167, 172
See application file for complete search history.

(56) References Cited

U.S. PATENT DOCUMENTS

| | | | |
|---|---|---|---|
| 2,801,185 A | 7/1957 | Iler |
| 2,976,576 A | 3/1961 | Wichterle |
| 3,712,706 A | 1/1973 | Stamm |
| 3,924,929 A | 12/1975 | Holmen |

(Continued)

FOREIGN PATENT DOCUMENTS

| | | |
|---|---|---|
| DE | 102007063471 | 12/2008 |
| EP | 142250 | 5/1985 |

(Continued)

OTHER PUBLICATIONS

Schubert, E.F., et al., "Low-refractive-index materials: A new class of optical thin-film materials," phys. Stat. sol. (b) 244, No. 8, pp. 3002-3008, © 2007 WILEY-VCH Verlag GmbH & Co. KGaA, Weinheim.

(Continued)

*Primary Examiner* — Euncha Cherry (57) ABSTRACT

Retroreflecting optical constructions are disclosed. A disclosed retroreflecting optical construction includes a retroreflecting layer that has a retroreflecting structured major surface, and an optical film that is disposed on the retroreflecting structured major surface of the retroreflecting layer. The optical film has an optical haze that is not less than about 30%. Substantial portions of each two neighboring major surfaces in the retroreflecting optical construction are in physical contact with each other.

19 Claims, 5 Drawing Sheets

(56) References Cited

U.S. PATENT DOCUMENTS

| | | | |
|---|---|---|---|
| 4,025,159 A | 5/1977 | McGrath |
| 4,127,693 A | 11/1978 | Lemelson |
| 4,202,600 A | 5/1980 | Burke |
| 4,243,618 A | 1/1981 | Van Arnam |
| 4,379,201 A | 4/1983 | Heilmann |
| 4,478,769 A | 10/1984 | Pricone |
| 4,522,958 A | 6/1985 | Das |
| 4,539,256 A | 9/1985 | Shipman |
| 4,588,258 A | 5/1986 | Hoopman |
| 4,618,518 A | 10/1986 | Pricone |
| 4,656,072 A | 4/1987 | Coburn, Jr. |
| 4,672,089 A | 6/1987 | Pricone |
| 4,696,719 A | 9/1987 | Bischoff |
| 4,726,706 A | 2/1988 | Attar |
| 4,726,989 A | 2/1988 | Mrozinski |
| 4,737,559 A | 4/1988 | Kellen |
| 4,775,219 A | 10/1988 | Appeldorn |
| 4,801,193 A | 1/1989 | Martin |
| 4,842,893 A | 6/1989 | Yializis |
| 4,906,070 A | 3/1990 | Cobb, Jr. |
| 4,954,371 A | 9/1990 | Yializis |
| 5,056,892 A | 10/1991 | Cobb, Jr. |
| 5,120,594 A | 6/1992 | Mrozinski |
| 5,156,863 A | 10/1992 | Pricone |
| 5,219,120 A | 6/1993 | Ehrenberg |
| 5,229,882 A | 7/1993 | Rowland |
| 5,238,623 A | 8/1993 | Mrozinski |
| 5,261,949 A | 11/1993 | Schilling |
| 5,614,286 A | 3/1997 | Bacon, Jr. |
| 5,677,050 A | 10/1997 | Bilkadi |
| 5,691,846 A | 11/1997 | Benson, Jr. |
| 5,694,701 A | 12/1997 | Huelsman |
| 5,759,468 A | 6/1998 | Smith |
| 5,804,610 A | 9/1998 | Hamer |
| 5,808,713 A | 9/1998 | Broer |
| 5,814,355 A | 9/1998 | Shusta |
| 5,831,766 A | 11/1998 | Martin |
| 5,854,709 A | 12/1998 | Couzin |
| 5,882,796 A | 3/1999 | Wilson |
| 5,919,555 A | 7/1999 | Yasuda |
| 5,930,041 A | 7/1999 | Thielman |
| 5,946,134 A | 8/1999 | Benson |
| 5,959,774 A | 9/1999 | Benson |
| 5,993,954 A | 11/1999 | Radovanovic |
| 6,004,422 A | 12/1999 | Janovec |
| 6,012,647 A | 1/2000 | Ruta |
| 6,132,861 A | 10/2000 | Kang |
| 6,139,158 A | 10/2000 | Nilsen |
| 6,166,855 A | 12/2000 | Ikeyama |
| 6,186,408 B1 | 2/2001 | Rodov |
| 6,204,202 B1 | 3/2001 | Leung |
| 6,210,485 B1 | 4/2001 | Zhao |
| 6,210,858 B1 | 4/2001 | Yasuda |
| 6,224,223 B1 | 5/2001 | Higuchi |
| 6,224,792 B1 | 5/2001 | Janovec |
| 6,231,797 B1 | 5/2001 | Bernard |
| 6,245,150 B1 | 6/2001 | Lyons |
| 6,254,675 B1 | 7/2001 | Aldinger |
| 6,285,001 B1 | 9/2001 | Fleming |
| 6,325,515 B1 | 12/2001 | Coderre |
| 6,350,035 B1 | 2/2002 | Smith |
| 6,355,759 B1 | 3/2002 | Sherman |
| 6,368,699 B1 | 4/2002 | Gilbert |
| 6,376,590 B2 | 4/2002 | Kolb |
| 6,383,559 B1 | 5/2002 | Nakamura |
| 6,413,882 B1 | 7/2002 | Leung |
| 6,457,823 B1 | 10/2002 | Cleary |
| 6,461,724 B1 | 10/2002 | Radovanovic |
| 6,470,610 B1 | 10/2002 | Northey |
| 6,521,047 B1 | 2/2003 | Brutti |
| 6,573,305 B1 | 6/2003 | Thunhorst |
| 6,645,331 B2 | 11/2003 | Northey |
| 6,656,571 B2 | 12/2003 | Benson |
| 6,671,452 B2 | 12/2003 | Winston |
| 6,677,028 B1 | 1/2004 | Lasch |
| 6,703,463 B2 | 3/2004 | Holguin |
| 6,719,426 B2 | 4/2004 | Magarill |
| 6,759,080 B2 | 7/2004 | Thunhorst |
| 6,797,396 B1 | 9/2004 | Liu |
| 6,843,571 B2 | 1/2005 | Sewall |
| 6,846,089 B2 | 1/2005 | Stevenson |
| 6,884,371 B2 | 4/2005 | Smith |
| 6,890,642 B2 | 5/2005 | Kaminsky |
| 6,899,944 B2 | 5/2005 | Tanaka |
| 6,911,486 B2 | 6/2005 | Mimura |
| 6,917,400 B2 | 7/2005 | Nakamura |
| 6,958,860 B2 | 10/2005 | Dontula |
| 6,967,053 B1 | 11/2005 | Mullen |
| 6,984,429 B2 | 1/2006 | Thunhorst |
| 7,027,671 B2 | 4/2006 | Huck |
| 7,032,324 B2 | 4/2006 | Kolb |
| 7,068,910 B2 | 6/2006 | Duine |
| 7,072,544 B2 | 7/2006 | Cornelissen |
| 7,108,810 B2 | 9/2006 | Nakamura |
| 7,132,136 B2 | 11/2006 | Laney |
| 7,157,839 B2 | 1/2007 | Ouderkirk |
| 7,195,360 B2 | 3/2007 | Bacon, Jr. |
| 7,241,437 B2 | 7/2007 | Davidson |
| 7,241,478 B2 | 7/2007 | McNeish |
| 7,251,079 B2 | 7/2007 | Capaldo |
| 7,261,424 B2 | 8/2007 | Smith |
| 7,278,775 B2 | 10/2007 | Yeo |
| 7,288,309 B2 | 10/2007 | Fleming |
| 7,293,884 B2 | 11/2007 | Sawayama |
| 7,309,135 B2 | 12/2007 | Smith |
| 7,327,415 B2 | 2/2008 | Brickey |
| 7,347,571 B2 | 3/2008 | Bacon, Jr. |
| 7,372,075 B2 | 5/2008 | Shigemura |
| 7,382,466 B2 | 6/2008 | Hill |
| 7,422,334 B2 | 9/2008 | Smith |
| 7,436,469 B2 | 10/2008 | Gehlsen |
| 7,442,442 B2 | 10/2008 | Strobel |
| 7,502,088 B2 | 3/2009 | Suzuki |
| 7,537,734 B2 | 5/2009 | Reichert |
| 7,547,105 B2 | 6/2009 | Bacon, Jr. |
| 7,611,251 B2 | 11/2009 | Thakkar |
| 7,615,283 B2 | 11/2009 | Radcliffe |
| 7,648,849 B2 | 1/2010 | Lee |
| 7,650,813 B2 | 1/2010 | Tsumiyama |
| 7,655,298 B2 | 2/2010 | Thies |
| 7,704,608 B2 | 4/2010 | Thies |
| 7,824,740 B2 | 11/2010 | Kawanishi |
| 7,892,606 B2 | 2/2011 | Thies |
| 7,898,710 B1 | 3/2011 | Scaggs |
| 7,914,192 B2 | 3/2011 | Coleman |
| 8,048,385 B2 | 11/2011 | Dong |
| 8,071,185 B2 | 12/2011 | Fürholz et al. |
| 8,371,703 B2 | 2/2013 | Smith |
| 8,651,720 B2 | 2/2014 | Sherman |
| 8,746,902 B2 | 6/2014 | Patel |
| 2003/0118750 A1 | 6/2003 | Bourdelais |
| 2004/0013856 A1 | 1/2004 | Araki |
| 2004/0056994 A1 | 3/2004 | Honda |
| 2004/0164325 A1 | 8/2004 | Siegel |
| 2006/0029784 A1 | 2/2006 | Doan |
| 2006/0193040 A1 | 8/2006 | Kim |
| 2006/0216455 A1 | 9/2006 | Soaft |
| 2006/0275595 A1 | 12/2006 | Thies |
| 2007/0020404 A1 | 1/2007 | Seiberle |
| 2007/0065638 A1 | 3/2007 | Wang |
| 2007/0189038 A1 | 8/2007 | Pokorny |
| 2008/0037127 A1 | 2/2008 | Weber |
| 2008/0043490 A1 | 2/2008 | Coleman |
| 2008/0121375 A1* | 5/2008 | Richason ............. F28D 20/028 165/96 |
| 2008/0151375 A1 | 6/2008 | Lin |
| 2008/0192352 A1 | 8/2008 | Laney |
| 2008/0214075 A1 | 9/2008 | Marte |

(56) References Cited

U.S. PATENT DOCUMENTS

| | | | |
|---|---|---|---|
| 2008/0303777 | A1 | 12/2008 | Inoue |
| 2008/0305282 | A1 | 12/2008 | Inakura |
| 2009/0074976 | A1 | 3/2009 | Freking |

FOREIGN PATENT DOCUMENTS

| | | |
|---|---|---|
| EP | 989443 | 3/2000 |
| EP | 1002830 | 5/2000 |
| EP | 1022587 | 7/2000 |
| EP | 1450202 | 8/2004 |
| EP | 1479734 | 11/2004 |
| EP | 2131218 | 12/2009 |
| GB | 1188736 | 4/1970 |
| GB | 1476447 | 6/1977 |
| JP | 6-186408 | 7/1994 |
| JP | 6347621 | 12/1994 |
| JP | H11-281802 | 10/1999 |
| JP | 2003084113 | 3/2003 |
| JP | 2004-271568 | 9/2004 |
| JP | 2004-325958 | 11/2004 |
| JP | 2005266343 | 9/2005 |
| JP | 2007-041573 | 2/2007 |
| JP | 2007-201433 | 8/2007 |
| JP | 2008003243 | 1/2008 |
| JP | 2009082890 | 4/2009 |
| WO | WO 98/17466 | 4/1998 |
| WO | WO 99/63368 | 12/1999 |
| WO | WO 01/04954 | 1/2001 |
| WO | WO 03/064304 | 8/2003 |
| WO | WO 2004/027474 | 4/2004 |
| WO | WO 2005/052557 | 6/2005 |
| WO | WO 2006/076320 | 7/2006 |
| WO | WO 2006/120638 | 11/2006 |
| WO | WO 2006/124588 | 11/2006 |
| WO | WO 2007/031539 | 3/2007 |
| WO | WO 2007/031541 | 3/2007 |
| WO | WO 2007/065847 | 6/2007 |
| WO | WO 2007/124217 | 11/2007 |
| WO | WO 2008/011919 | 1/2008 |
| WO | WO 2008/090821 | 7/2008 |
| WO | WO 2008/098872 | 8/2008 |
| WO | WO 2008/144136 | 11/2008 |
| WO | WO 2008/144644 | 11/2008 |
| WO | WO 2008/144656 | 11/2008 |
| WO | WO 2010/059566 | 5/2010 |
| WO | WO 2010/059568 | 5/2010 |
| WO | WO 2010/059579 | 5/2010 |
| WO | WO 2010/059614 | 5/2010 |
| WO | WO 2010/120422 | 10/2010 |
| WO | WO 2010/120468 | 10/2010 |
| WO | WO 2010/120845 | 10/2010 |
| WO | WO 2010/120864 | 10/2010 |
| WO | WO 2010/120871 | 10/2010 |
| WO | WO 2010/120971 | 10/2010 |
| WO | WO 2010/121054 | 10/2010 |
| WO | WO 2010/121056 | 10/2010 |
| WO | WO 2011/050232 | 4/2011 |

OTHER PUBLICATIONS

ASTM Designation: D 1003-00, "Standard Test Method for Haze and Luminous Transmittance of Transparent Plastics", 2000, pp. 1-6.
Boisvert, Influence of Structural Properties of Nanoporous Silica-Polymer Materials on Ink Absorption, Nordic Pulp and Paper Research Journal, vol. 18, No. 2, pp. 210-216, (2003).
Brunauer, Adsorption of Gases in Multimolecular Layers, vol. 60, pp. 309-319, (Feb. 1938).
Cornelissen, Efficient and Cost-Effective Polarized-Light Backlights for LCDs, Proc. of SPIE, vol. 7058, pp. 1-10, (2008).
Haze, Applications Note, vol. 9, No. 6, pp. 1-4, (2008).
Ibn-Elhaj, Optical Polymer Thin Films With Isotropic and Anisotropic Nano-Corrugated Surface Topologies, Nature, vol. 410, pp. 796-799, (Apr. 12, 2001).
Kemsley, Modernizing TLC, New Instrumentation, Materials, and Analysis Techniques Take Lab Staple Into High-Performance Arena, Chemical & Engineering News, vol. 87, No. 20, pp. 11-18, (May 18, 2009).
Miyamoto, Control of Refractive Index of Pressure-Sensitive Adhesives for the Optimization of Multilayered Media, Jpn. J. Appl. Phys., vol. 46, pp. 3978-3980, (2007).
Patton, "Pigment/Binder Geometry", Paint Flow and Pigment Dispersion: A Rheological Approach to Coating and Ink Technology, Chapter 5, 2nd Edition, Wiley & Sons, pp. 126-180, (1978).
Peng, Enhanced Coupling of Light From Organic Light Emitting Diodes Using Nanopourous Films, J. Appl. Phys., vol. 96, No. 3, pp. 1649-1654, (Aug. 1, 2004).
Polymer Handbook, Bandrup, Immergut, and Grulke, 4th Edition, Parts I-VIII, (1999).
Rohr, Photografting and the Control of Surface Chemistry in Three-Dimensional Porous Polymer Monoliths, Macromolecules, vol. 36, pp. 1677-1684, (2003).
Shen, Low Dielectric Constant Silica Films With Ordered Nanoporous Structure, Materials Science and Engineering, C 27, pp. 1145-1148, (2007).
Smith, Driver-Focused Design of Retroreflective Sheeting for Traffic Signs, $87^{th}$ Annual Meeting of Transportation Research Board, pp. 1-17, (Jan. 13-17, 2008).
Sudduth, Modeling Cluster Voids and Pigment Distribution to Predict Properties and CPVC in Coatings, Part 1: Dry Coating Analysis, Pigment and Resin Technology, vol. 37, No. 6, pp. 375-388, (2008).
Tsutsui, Doubling Coupling-Out Efficiency in Organic Light-Emitting Devices Using a Thin Silica Aerogel Layer, Adv. Mater., vol. 13, No. 15, pp. 1149-1152, (Aug. 3, 2001).
"Visual Acuity", NDT Resource Center, Iowa State University [online], [retrieved from the internet on Jun. 24, 2011], http://www.ndt.org/EducationResources/CommunityCollege/PenetrantTest/Introduction/visualacuity.htm, 3 pages.
"Visual Acuity", Wikipedia, [online], [retrieved from the internet on Jun. 24, 2011], http://en.wikipedia.org/wiki/Visual_acuity#Visual_acuity_expression, 13 pages.
Walheim, Nanophase-Separated Polymer Films As High-Performance Antireflection Coatings, Science, vol. 283, pp. 520-522, (1999).
"Why Some Paints are Transparent and Others Opaque, Light and Color Effects in Painting: Refractive Index", Natural Pigments, George O'Hanlon, Natural Pigments LLC, Willits, CA, USA [online], [retrieved from the internet on May 26, 2010], <www.naturalpigments.com/education/article.asp?ArticleD=8>, 9 pages.
Yoder, Jr., Study of Light Deviation Errors in Triple Mirrors and Tetrahedral Prisms, J. Optical Soc. Am., vol. 48, No. 7, pp. 496-499, (Jul. 1958).
Yu, Comparison of Different Measurement Methods for Transmittance Haze, Metrologia, vol. 46, pp. 233-237, (2009). (XP002603289).
Yu, Preparation of Monolithic Polymers With Controled Porous Properties for Microfluidic Chip Applications Using Photoinitiated Free-Radical Polymerization, J. of Polymer Science, Part A, Polymer Chemistry, vol. 40, pp. 755-769, (2002).
"3M Reflectivity, How We See," Jan. 1, 2004, 2 pgs.

* cited by examiner

FIG. 8B

RETROREFLECTING OPTICAL CONSTRUCTION

FIELD OF THE INVENTION

This invention generally relates to retroreflective optical articles that include a low index porous optical film. The invention is further applicable to retroreflective optical articles that include an optically diffusive film that exhibit some low-index-like properties.

BACKGROUND

Retroreflective sheetings reflect incident light back toward the originating light source. Retroreflective sheetings are commonly used in, for example, road signs, license plates, barricades and safety garments to improve or enhance their visibility in poor lighting conditions.

Cube corners are commonly used in retroreflective sheetings. Typically, a cube corner includes three mutually perpendicular optical faces that intersect at a single apex. Generally, light that is incident on a corner cube from a light source, is totally internally reflected from each of the three perpendicular cube corner optical faces, and is redirected back toward the light source. Presence of, for example, dirt, water and adhesive on the optical faces can prevent total internal reflection (TIR) and lead to a reduction in the retroreflected light intensity. As such, the air interface is typically protected by a sealing film, but such films typically reduce the total active area, which is the area over which retroreflection can occur. Metallized cube corners do not rely on TIR for retroreflecting light, but they are typically not white enough for daytime viewing of, for example, signing applications. Furthermore, the durability of the metal coatings may also be inadequate.

SUMMARY OF THE INVENTION

Generally, the present invention relates to retroreflecting optical constructions. In one embodiment, an optical construction includes a retroreflecting layer that has a retroreflecting structured major surface, an optical film that is disposed on the retroreflecting structured major surface and has an effective index of refraction that is not greater than about 1.3, and an optically diffusive layer that is disposed on the optical film and has an optical haze that is not less than about 30%. Substantial portions of each two neighboring major surfaces in the retroreflecting optical construction are in physical contact with each other. In some cases, the optical film has an effective index of refraction that is not greater than about 1.2, or not greater than about 1.15, or not greater than about 1.1. In some cases, the optically diffusive layer has an optical haze that is not less than about 50%, or not less than about 70%, or not less than about 90%. In some cases, at least 50%, or at least 70%, or at least 90%, of each two neighboring major surfaces in the retroreflecting optical construction are in physical contact with each other. In some cases, the optical film substantially planarizes the retroreflecting layer. In some cases, the optical film includes a binder, a plurality of particles and a plurality of interconnected voids, where a volume fraction of the plurality of interconnected voids in the optical film is not less than about 20% and the weight ratio of the binder to the plurality of the particles is not less than about 1:1.

In another embodiment, a retroreflecting optical construction includes a retroreflecting layer that has a retroreflecting structured major surface, and an optical film that is disposed on the retroreflecting structured major surface of the retroreflecting layer and has an optical haze that is not less than about 30%. Substantial portions of each two neighboring major surfaces in the retroreflecting optical construction are in physical contact with each other. In some cases, at least 50%, or at least 70%, or at least 90%, of each two neighboring major surfaces in the retroreflecting optical construction are in physical contact with each other. In some cases, the optical film includes a plurality of particles and a plurality of interconnected voids, where the volume fraction of the plurality of interconnected voids in the optical film is not less than about 20% and the weight ratio of the plurality of the particles to the binder is in a range from about 2:1 to about 6:1.

In another embodiment, a retroreflecting optical construction includes a retroreflecting layer that has a retroreflecting structured major surface, and an optical film that is disposed on a first portion of the retroreflecting structured major surface. The optical film includes a binder, a plurality of particles and a plurality of voids. The first portion of the retroreflecting structured major surface exhibits a coefficient of retroreflection $R_A$ that is not less than about 50 cd/(lux·m$^2$) for an observation angle of 0.2 degrees and an entrance angle of −4 degrees. In some cases, the first portion is not less than about 30%, or not less than about 45%, or not less than about 60%, of the retroreflecting structured major surface. In some cases, RA is not less than about 100 cd/(lux·m$^2$), or not less than about 200 cd/(lux·m$^2$), or not less than about 300 cd/(lux·m$^2$), for an observation angle of 0.2 degrees and an entrance angle of −4 degrees.

In another embodiment, a retroreflecting optical construction includes a retroreflecting layer that has a retroreflecting structured major surface, and an optical film that is disposed on a first portion of the retroreflecting structured major surface. The optical film includes a binder, a plurality of particles and a plurality of voids. The first portion of the retroreflecting structured major surface exhibits a total light return that is not less than about 5% for incident visible light at an entrance angle of −4 degrees. In some cases, the total light return is not less than about 10%, or not less than about 20%, or not less than about 30%, for incident visible light at an entrance angle of −4 degrees.

BRIEF DESCRIPTION OF DRAWINGS

The invention may be more completely understood and appreciated in consideration of the following detailed description of various embodiments of the invention in connection with the accompanying drawings, in which.

In the specification, a same reference numeral used in multiple figures refers to the same or similar elements having the same or similar properties and functionalities.

DETAILED DESCRIPTION

This invention generally relates to retroreflective films and optical constructions that include one or more optical films that have a low index of refraction or exhibit some low-index-like optical properties. Some disclosed retroreflective optical constructions include one or more optical films that have a low optical haze or diffuse reflectance and a low effective index of refraction, such as an optical haze of less than about 5% and an effective index of refraction that is less than about 1.3. In such cases, the low index optical films can efficiently support or maintain total internal reflection. Some disclosed retroreflective optical constructions include one or more optical films that have a high optical haze or diffuse reflectance while manifesting some low-index-like optical properties, such as, for example, the ability to support total internal reflection or enhance internal reflection. A retroreflective optical construction that incorporates such a diffusive optical film can have a white appearance, a desirable attribute especially in daylight viewing, while at the same time, retroreflecting with high efficiency.

Some disclosed optical films support total internal reflection (TIR) or enhanced internal reflection (EIR) by virtue of including a plurality of voids. When light that travels in an optically clear non-porous medium is incident on a stratum possessing high porosity, the reflectivity of the incident light is much higher at oblique angles than at normal incidence. In the case of no or low haze voided films, the reflectivity at oblique angles greater than the critical angle is close to about 100%. In such cases, the incident light undergoes total internal reflection (TIR). In the case of high haze voided films, the oblique angle reflectivity can be close to 100% over a similar range of incident angles even though the light may not undergo TIR. This enhanced reflectivity for high haze films is similar to TIR and is designated as Enhanced Internal Reflectivity (EIR). As used herein, by a porous or voided optical film enhancing internal reflection (EIR), it is meant that the reflectance at the boundary of the voided and non-voided strata of the film or film laminate is greater with the voids than without the voids.

The disclosed optical films include a plurality of voids dispersed in a binder. The voids have an index of refraction $n_v$ and a permittivity $\epsilon_v$, where $n_v^2 = \epsilon_v$, and the binder has an index of refraction $n_b$ and a permittivity $\epsilon_b$, where $n_b^2 = \epsilon_b$. In general, the interaction of an optical film with light, such as light that is incident on, or propagates in, the optical film, depends on a number of film characteristics such as, for example, the film thickness, the binder index, the void or pore index, the pore shape and size, the spatial distribution of the pores, and the wavelength of light. In some cases, light that is incident on or propagates within the optical film, "sees" or "experiences" an effective permittivity $\epsilon_{eff}$ and an effective index $n_{eff}$, where $n_{eff}$ can be expressed in terms of the void index $n_v$, the binder index $n_b$, and the void porosity or volume fraction "f". In such cases, the optical film is sufficiently thick and the voids are sufficiently small so that light cannot resolve the shape and features of a single or isolated void. In such cases, the size of at least a majority of the voids, such as at least 60% or 70% or 80% or 90% of the voids, is not greater than about $\lambda/5$, or not greater than about $\lambda/6$, or not greater than about $\lambda/8$, or not greater than about $\lambda/10$, or not greater than about $\lambda/20$, where $\lambda$ is the wavelength of light.

In some cases, light that is incident on a disclosed optical film is a visible light meaning that the wavelength of the light is in the visible range of the electromagnetic spectrum. In such cases, the visible light has a wavelength that is in a range from about 380 nm to about 750 nm, or from about 400 nm to about 700 nm, or from about 420 nm to about 680 nm. In such cases, the optical film has an effective index of refraction and includes a plurality of voids if the size of at least a majority of the voids, such as at least 60% or 70% or 80% or 90% of the voids, is not greater than about 70 nm, or not greater than about 60 nm, or not greater than about 50 nm, or not greater than about 40 nm, or not greater than about 30 nm, or not greater than about 20 nm, or not greater than about 10 nm.

In some cases, the disclosed optical films are sufficiently thick so that the optical film can reasonably have an effective index that can be expressed in terms of the indices of refraction of the voids and the binder, and the void or pore volume fraction or porosity. In such cases, the thickness of the optical film is not less than about 100 nm, or not less than about 200 nm, or not less than about 500 nm, or not less than about 700 nm, or not less than about 1,000 nm.

When the voids in a disclosed optical film are sufficiently small and the optical film is sufficiently thick, the optical film has an effective permittivity $\epsilon_{eff}$ that can be expressed as:

$$\epsilon_{eff} = f\epsilon_v + (1-f)\epsilon_b \tag{1}$$

In such cases, the effective index $n_{eff}$ of the optical film can be expressed as:

$$n_{eff}^2 = fn_v^2 + (1-f)n_b^2 \tag{2}$$

In some cases, such as when the difference between the indices of refraction of the pores and the binder is sufficiently small, the effective index of the optical film can be approximated by the following expression:

$$n_{eff} = fn_v + (1-f)n_b \tag{3}$$

In such cases, the effective index of the optical film is the volume weighted average of the indices of refraction of the voids and the binder. For example, an optical film that has a void volume fraction of about 50% and a binder that has an index of refraction of about 1.5, has an effective index of about 1.25.

Figure 1A:
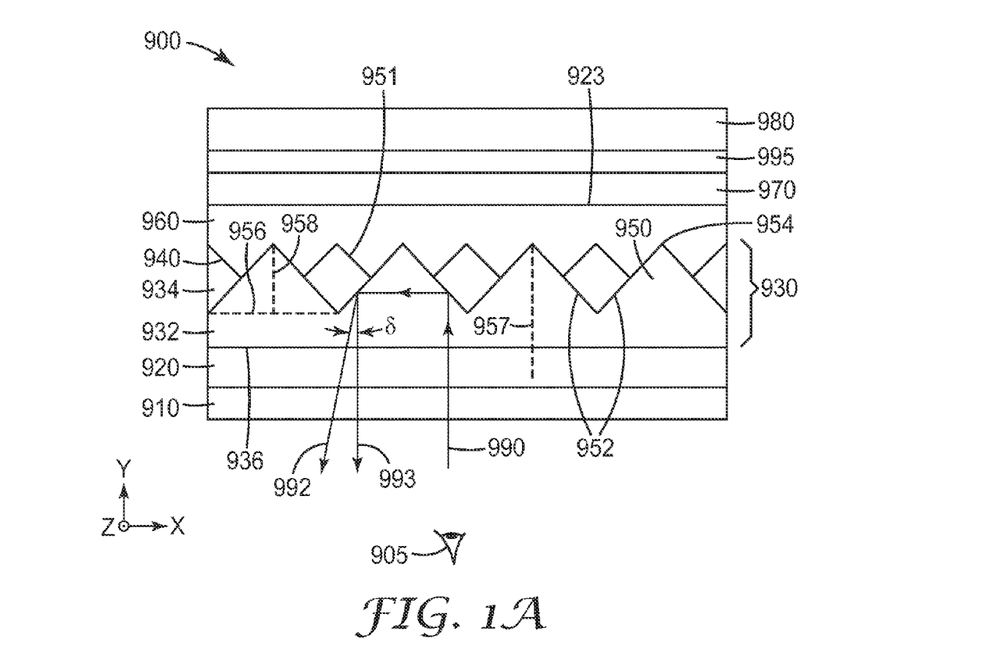
FIG. 1A is a schematic side-view of a retroreflecting optical construction.

FIG. 1A is a schematic side-view of a retroreflecting optical construction 900 that includes a retroreflecting layer 930 that includes a front major surface 936 that faces a viewer 905 and a retroreflecting structured major surface 940 opposite surface 936, an optical film 960 disposed on retroreflecting major surface 940, an optical adhesive layer 970 disposed on the optical film, an optically diffusive layer 995 disposed on the optical adhesive layer, and a first substrate 980 disposed on the optical adhesive layer. Retroreflecting optical construction 900 further includes an optically transparent second substrate 920 disposed on front major surface 936 of the retroreflecting layer and a graphics layer 910 disposed on the second substrate.

The coefficient of retroreflection $R_A$, sometimes referred to as the retroreflectivity, of retroreflecting optical construction 900 can vary depending on the properties desired in an application. In some cases, $R_A$ meets the ASTM D4956-07e1 standards at 0 degree and 90 degree orientation angles. In some cases, $R_A$ is in a range from about 5 cd/(lux·m$^2$) to about 1500 cd/(lux·m$^2$) when measured at 0.2 degree observation angle and +5 degree entrance angle according to ASTM E-810 test method or CIE 54.2; 2001 test method. In some cases, such as in cases where optical construction 900 is used in a traffic control sign, a delineator, or a barricade, $R_A$ is at least about 330 cd/(lux·m$^2$), or at least about 500 cd/(lux·m$^2$), or at least about 700 cd/(lux·m$^2$) as measured according to ASTM E-810 test method or CIE 54.2; 2001 test method at 0.2 degree observation angle and +5 degree entrance angle. In some cases, such as in motor vehicle related application, $R_A$ is at least about 60 cd/(lux·m$^2$), or at least about 80 cd/(lux·m$^2$), or at least about 100 cd/(lux·m$^2$) as measured according to ASTM E-810 test method or CIE 54.2; 2001 test method at 0.2 degree observation angle and +5 degree entrance angle.

Figure 1B:
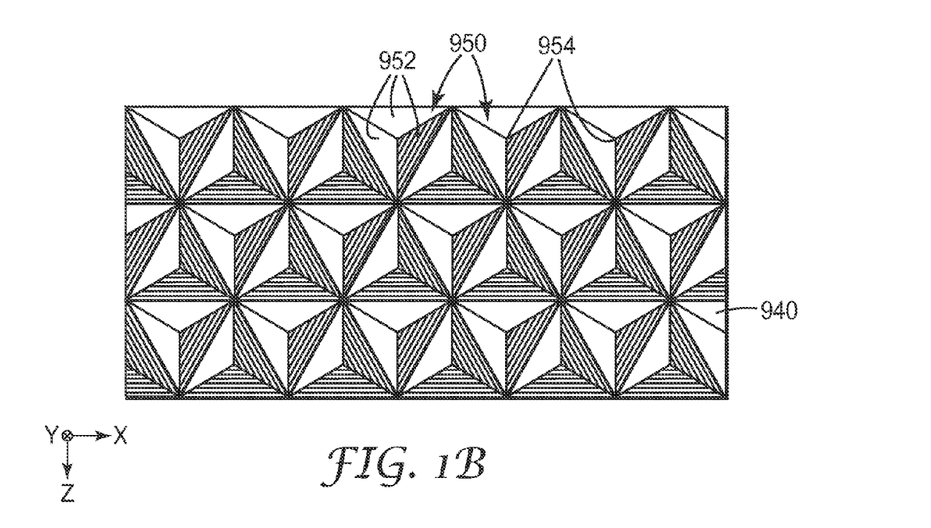
FIG. 1B is a schematic top-view of a retroreflecting layer.

Retroreflecting layer 930 includes a retroreflecting portion 934 that includes a plurality or an array of retroreflecting optical elements 950 and a land portion 932 that connects the retroreflecting optical elements. FIG. 1B is a schematic topview of retroreflecting layer 930. In some cases, such as in the exemplary optical construction 900, each retroreflecting optical element 950 is in the form of a tetrahedron or a pyramid, such as a regular tetrahedron or pyramid, having three planar facets or sides 952 and a base 956, where the sides meet at an apex 954. The dihedral angle between any two facets may vary depending on the properties desired in an application. In some cases, the dihedral angle between any two facets 952 is 90 degrees. In such cases, facets 952 are substantially perpendicular to one another (as in the corner of a room) and the optical element may be referred to as a cube corner. In some cases, the dihedral angle between adjacent facets 952 can deviate from 90° as described, for example, in U.S. Pat. No. 4,775,219, the disclosure of which is incorporated in its entirety herein by reference.

In some cases, optical elements 950 can be truncated cube corners. In some cases, optical elements 950 can be full cubes or preferred geometry (PG) cubes as described in, for example, U.S. Pat. No. 7,422,334, the disclosure of which is incorporated in its entirety herein by reference.

Each retroreflecting optical element 950 includes a symmetry axis 957 that makes equal angles with facets 952. In some cases, such as in the exemplary optical construction 900, symmetry axis 957 is perpendicular to base 956 or front surface 936. In some cases, the symmetry axis is not perpendicular to the base or the front surface. In such cases, apex 954 or optical element 950 is canted as described, for example, in U.S. Pat. No. 4,588,258.

The principle of operation of a retroreflective cube corner is well known and is described, for example, in J. Optical Soc. of America 46(7), 496 (1958). In sum, a light ray 990 propagating along the positive y-direction and incident on a retroreflecting optical element 950, is totally internally reflected (TIR) by each of facets 952 of the optical element resulting in a retroreflected light ray 993 propagating along the negative y-direction and parallel to incident light ray 990. In some cases, the retroreflected light ray deviates from the y-direction as retroreflected light ray 992 making a divergence angle δ with the y-axis. In some cases, such as in the case of a road sign, the divergence angle δ is in a range from about 0.2 degrees to about 2 degrees. Any breakdown of TIR can substantially reduce the intensity of retroreflected light ray 993.

Optical film 960 has a sufficiently low index of refraction so as to maintain or support TIR resulting in efficient retroreflection by retroreflective layer 930. In some cases, the effective index of refraction of optical film 960 is not greater than about 1.3, or not greater than about 1.25, or not greater than about 1.2, or not greater than about 1.15, or not greater than about 1.1.

Optical adhesive layer 970 adheres optical film 960 to optically diffusive layer 995. In some cases, adhesive layer 970 is substantially optically diffusive and can have a white appearance. For example, in such cases, the optical haze of an optically diffusive adhesive layer 970 is not less than about 30%, or not less than about 40%, or not less than about 50%, or not less than about 60%, or not less than about 70%, or not less than about 80%, or not less than about 90%, or not less than about 95%. In some case, the diffuse reflectance of the diffusive adhesive layer is not less than about 20%, or not less than about 30%, or not less than about 40%, or not less than about 50%, or not less than about 60%. In such cases, the adhesive layer can be optically diffusive by including a plurality of particles dispersed in an optical adhesive where the particles and the optical adhesive have different indices of refraction. The mismatch between the two indices of refraction can scatter light. In some cases, such as when optical adhesive layer 970 is optically diffusive, optical construction 900 may not include the optically diffusive layer 995.

Optical adhesive layer 970 can include any optical adhesive that may be desirable and/or available in an application. Exemplary optical adhesives include pressure sensitive adhesives (PSAs), heat-sensitive adhesives, solvent-volatile adhesives, and UV-curable adhesives such as UV-curable optical adhesives available from Norland Products, Inc. Exemplary PSAs include those based on natural rubbers, synthetic rubbers, styrene block copolymers, (meth)acrylic block copolymers, polyvinyl ethers, polyolefins, and poly(meth)acrylates. As used herein, (meth)acrylic (or acrylate) refers to both acrylic and methacrylic species. Other exemplary PSAs include (meth)acrylates, rubbers, thermoplastic elastomers, silicones, urethanes, and combinations thereof. In some cases, the PSA is based on a (meth)acrylic PSA or at least one poly(meth)acrylate. Exemplary silicone PSAs include a polymer or gum and an optional tackifying resin. Other exemplary silicone PSAs include a polydiorganosiloxane polyoxamide and an optional tackifier.

In some cases, optical adhesive layer 970 can include cross-linked tackified acrylic pressure sensitive adhesives. Optical adhesive layer 970 can include additives such as tackifiers, plasticizers and fillers (such as pigments such as TiO$_2$). In some cases, TiO$_2$ can be added to the adhesive layer to give it a white appearance.

Optically diffusive layer 995 diffuses incident light and can advantageously give a white appearance to optical construction 900 in, for example, daylight conditions. Optically diffusive layer 995 can be any optically diffusive layer that may be desirable and/or available in an application. For example, the optically diffusive layer can include a plurality of particles dispersed in a binder where the particles and the binder have different indices of refraction. In some cases, such as when optically diffusive layer 995 is sufficiently diffusive to impart a white look to optical construction 900, the optically diffusive layer has an optical haze that is not less than about 40%, or not less than about 50%, or not less than about 60%, or not less than about 70%, or not less than about 80%, or not less than about 90%, or not less than about 95%.

In some cases, optically diffusive layer 995 can also be an adhesive. In such cases, the optically diffusive layer 995 can provide sufficient adhesion, in which case, optical construction 900 may not include optical adhesive layer 970.

Substantial portions of neighboring major surfaces of each two neighboring layers in optical construction 900 are in physical contact with each other. For example, substantial portions of neighboring structured major surfaces 951 and 940 of respective neighboring layers 960 and 930 in optical construction 900 are in physical contact with each other. For example, at least 30%, or at least 40%, or at least 50%, or at least 60%, or at least 70%, or at least 80%, or at least 90%, or at least 95% of the two neighboring major surfaces are in physical contact with each other. In some cases, optical film 960 is coated on surface 940 of retroreflecting layer 930.

In general, substantial portions of neighboring major surfaces (major surfaces that face each other or are adjacent to each other) of each two neighboring layers in optical construction 900 are in physical contact with each other. For example, in some cases, there may be one or more additional layers, not expressly shown in FIG. 1A, disposed between optical film 960 and retroreflecting layer 930. In such cases, substantial portions of neighboring major surfaces of each two neighboring layers in optical construction 900 are in physical contact with each other. In such cases, at least 30%, or at least 40%, or at least 50%, or at least 60%, or at least 70%, or at least 80%, or at least 90%, or at least 95% of the neighboring major surfaces of each two neighboring layers in the optical construction are in physical contact with each other.

Optical film 960 can be any optical film that has a sufficiently low index of refraction, such as those described in co-pending application titled "OPTICAL FILM", Ser. No. 61/169,466, filed on the same date as the present application, the disclosure of which is incorporated in its entirety herein by reference. In some cases, optical film 960 includes a binder, a plurality of particles and a plurality of interconnected voids. The volume fraction of the plurality of interconnected voids in the optical film is not less than about 20%, or not less than about 30%, or not less than about 40%, or not less than about 50%, or not less than about 60%, or not less than about 70%, or not less than about 80%. The weight ratio of the binder to the plurality of particles is not less than about 1:1, or not less than about 1.5:1, or not less than about 2:1, or not less than about 2.5:1, or not less than about 3:1, or not less than about 3.5:1, or not less than about 4:1. The optical film has a substantially low optical haze. For example, in such cases, the optical haze of the optical film is not greater than about 10%, or not greater than about 7%, or not greater than about 5%, or not greater than about 3%, or not greater than about 2%, or not greater than about 1.5%, or not greater than about 1%. In some cases, the particles in the optical film can be approximately spherical. In some cases, the particles can be elongated.

Figure 2:
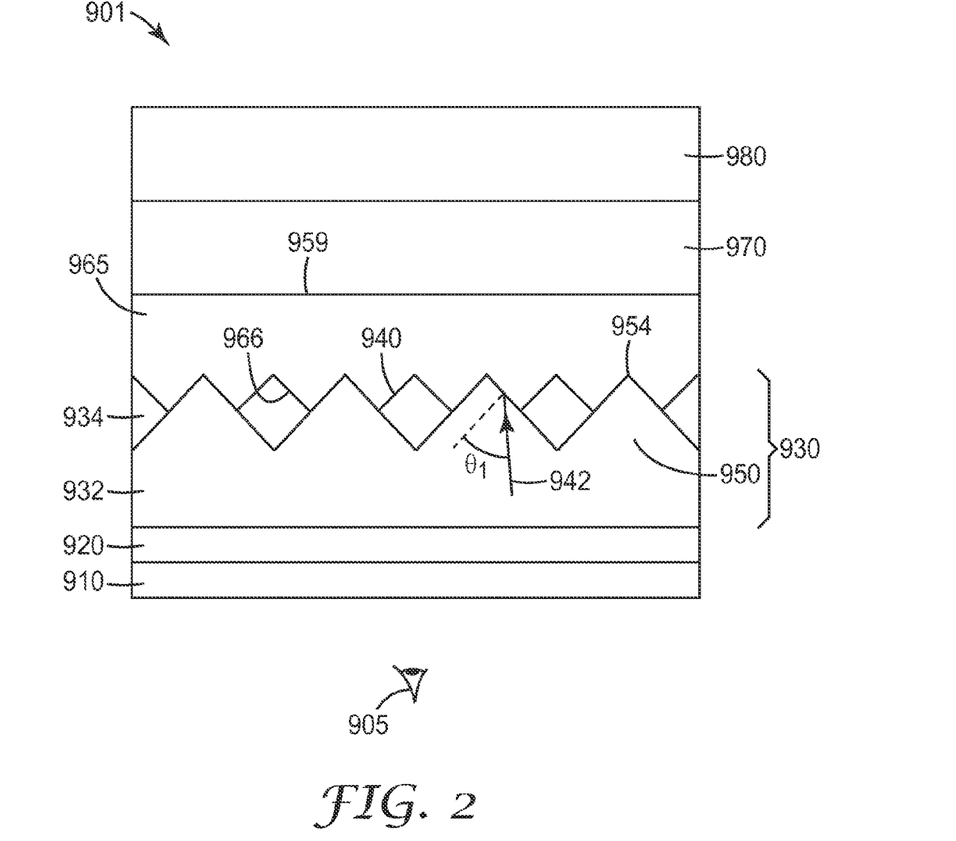
FIG. 2 is a schematic side-view of another retroreflecting optical construction.

FIG. 2 is a schematic side-view of a retroreflecting optical construction 901 that includes optional graphics layer 910, second substrate 920 disposed on the graphics layer, retroreflecting layer 930 disposed on the second substrate, an optical film 965 disposed on the retroreflecting layer, optical adhesive layer 970 disposed on the optical film, and first substrate 980 disposed on the optical adhesive layer.

Optical film 965 is substantially optically diffusive. For example, optical film 965 has an optical haze that is not less than about 20%, or not less than about 30%, or not less than about 40%, or not less than about 50%, or not less than about 60%, or not less than about 70%, or not less than about 80%, or not less than about 90%, or not less than about 95%. In some cases, the diffuse reflectance of the optical film is not less than about 20%, or not less than about 30%, or not less than about 40%, or not less than about 50%, or not less than about 60%.

Furthermore, optical film 965 exhibits some low-index-like properties. In particular, optical film 965 supports or maintains TIR and/or promotes internal reflection at the interface with retroreflecting layer 930.

Optical film 965 includes a structured major surface 966 that faces structured major surface 940 of retroreflecting layer 930. Substantial portions of neighboring major surfaces of each two neighboring layers in optical construction 901 are in physical contact with each other. For example, substantial portions of neighboring structured major surfaces 966 and 940 respective neighboring layers 965 and 930 in optical construction 901 are in physical contact with each other. For example, at least 50%, or at least 60%, or at least 70%, or at least 80%, or at least 90%, or at least 95% of the two neighboring major surfaces are in physical contact with each other. In some cases, optical film 965 is coated on structured surface 940 of the retroreflecting layer.

In general, substantial portions of neighboring major surfaces (major surfaces that face each other or are adjacent to each other) of each two neighboring layers in optical construction 901 are in physical contact with each other. For example, in some cases, there may be one or more additional layers, not expressly shown in FIG. 2, disposed in between retroreflecting layer 930 and optical film 965. In such cases, substantial portions of neighboring major surfaces of each two neighboring layers in optical construction 901 are in physical contact with each other. In such cases, at least 50%, or at least 60%, or at least 70%, or at least 80%, or at least 90%, or at least 95% of the neighboring major surfaces of each two neighboring layers in the optical construction are in physical contact with each other.

In general, optical film 965 can be any optically diffusive film that promotes or maintains TIR or enhances internal reflection such as those described in co-pending application titled "OPTICAL FILM", Ser. No. 61/169,466. In some cases, the optical film includes a binder, a fumed metal oxide such as a fumed silica or alumina, and a plurality or network of interconnected voids, where the voids provide the desired optical haze. In some cases, the weight ratio of the fumed metal oxide to the binder is in a range from about 2:1 to about 6:1, or in a range from about 2:1 to about 4:1.

In some cases, optical film 965 can be or include any optical film that includes a plurality of voids, where the voids provide sufficient optical haze and the optical film is sufficiently porous to promote or maintain TIR or enhance internal reflection.

In the exemplary optical constructions 900 and 901, optical films 960 and 965 fill the grooves in between optical elements 950 and substantially planarize retroreflecting structured surface 940, meaning that top surfaces 923 and 959 of respective optical films 960 and 965 are substantially planar. For example, in such cases, the difference between the maximum and minimum heights of top surface 923 as measured from a common reference plane such as reference surface 936, is not more than about 20%, or not more than about 15%, or not more than about 10%, or not more than about 5% of height $h_1$ of optical elements 950, where $h_1$ is the distance 958 between apex 954 and base 956.

Figure 3:
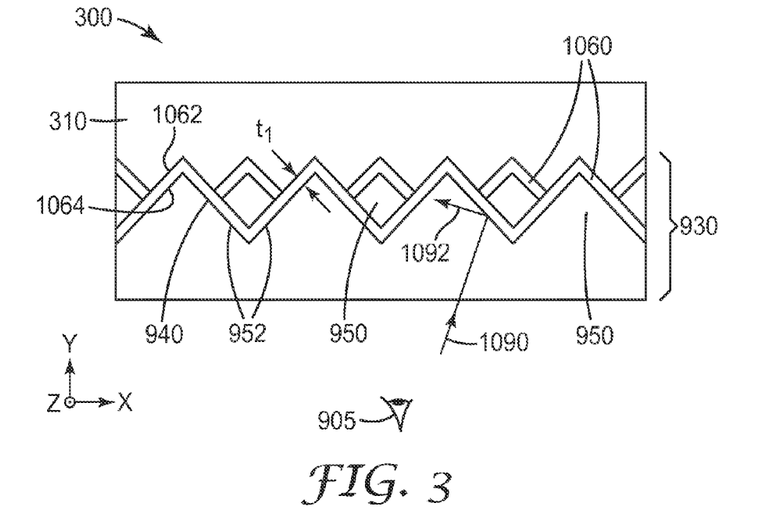
FIG. 3 is a schematic side-view of another retroreflecting optical construction.

In some cases, the optical film does not planarize structured surface 940. For example, FIG. 3 is a schematic side-view of an optical construction 300 that includes an optical film 1060 that is substantially conformally disposed on retroreflecting structured surface 940 of retroreflecting layer 930, and an optical layer 310 that is disposed on and substantially planarizes the optical film. Optical layer 310 can, for example be a substrate similar to substrate 980, or an optical adhesive layer similar to layer 970, or an optically diffusive layer similar to layer 995.

Optical film 1060 has a thickness $t_1$. In some cases, thickness $t_1$ is not less than the minimum thickness required to substantially support total internal reflection at the retroreflecting surface 934. In such cases, $t_1$ is sufficiently large so that the evanescent tail of an incident optical ray 1090 at the interface between retroreflecting layer 930 and optical film 1060 remains substantially within the optical film and does not extend, or extends very little, into the neighboring optical layer 310. In such cases, incident light ray 1090 is totally internally reflected as light ray 1092 and no fraction, or a very small fraction, of the incident light ray couples into layer 310. In such cases, thickness $t_1$ is not less than about 0.5 microns, or not less than about 0.6 microns, or not less than about 0.7 microns, or not less than about 0.8 microns, or not less than about 0.9 microns, or not less than about 1 micron, or not less than about 1.1 microns, or not less than about 1.2 microns, or not less than about 1.3 microns, or not less than about 1.4 microns, or not less than about 1.5 microns, or not less than about 1.7 microns, or not less than about 2 microns.

Optical film 1060 includes two structured major surfaces. In particular, the optical film comprises a first structured major bottom surface 1064 that faces retroreflecting layer 930 and a second structured major top surface 1062 that is opposite first structured major surface 1064.

Referring back to FIG. 1A, one of or both substrates 920 and 980 can provide support to and increase the strength of retroreflecting optical construction 900. Substrate 920 is substantially optically transmittance. For example, the optical transmittance of substrate 920 is not less than about 50%, or not less than about 60%, or not less than about 70%, or not less than about 80%, or not less than about 90%.

Substrate 980 can be optically opaque or transmissive. In some cases, rear substrate 980 can be a rigid plate, such as a rigid aluminum plate. For example, optical construction 900 can be part of a road sign or a motor vehicle's license plate and substrate 980 can be a rigid aluminum back plate. In some cases, optical construction 900 does not include the first substrate 980.

The exemplary optical elements 950 in FIGS. 1A and 1B have pyramidal or tetrahedral shapes. In general, optical elements 950 can have any suitable shape that can provide efficient reflection or retroreflection in an application.

In some cases, such as when retroreflecting optical construction 900 is intended to be substantially flexible, retroreflecting layer 930 does not include land portion 932. In such cases, the retroreflecting optical elements are not connected to each other through a land portion and can be directly formed on, for example, substrate 920. The use of discrete unconnected cube-corner optical elements 950 can increase the flexibility of retroreflecting optical construction 900 because each cube-corner optical element 950 can move independently of the other cube-corner optical elements.

Graphics layer 910 is an optional layer and includes one or more graphic images for viewing by viewer 905 under suitable lighting conditions, such as daytime lighting conditions. A graphic image can be a colored image and can be optically transmissive for all the colors included in the image, although the graphics layer can be more optically transmissive for brighter colors and less optically transmissive for darker colors. In some cases, the optical transmittance of the graphics layer for any color included in the layer is at least 5%, or at least 7%, or at least 10%. Graphics layer 910 can be formed by any suitable method, such as any suitable printing or coating method, and can include different colorants, such as different dyes or pigments, appropriately dispersed in a binder.

In the exemplary retroreflecting optical construction 900, graphics layer 910 is disposed on the front of the construction. In general, the graphics layer, if included, can be disposed any where that may be desirable in an application. For example, in some cases, the graphics layer can be disposed between layers 920 and 930.

Figure 4:
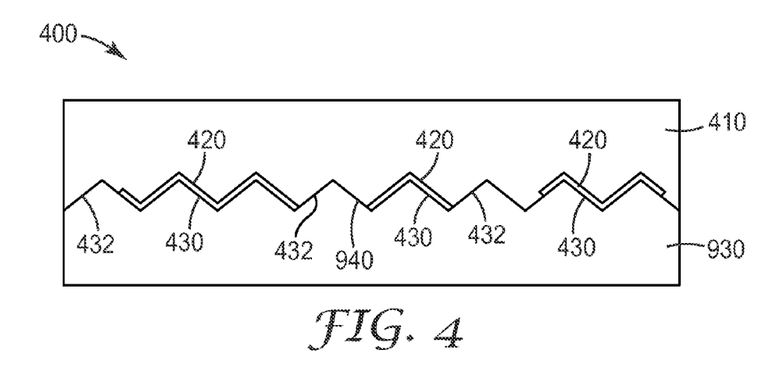
FIG. 4 is a schematic side-view of another retroreflecting optical construction.

In the exemplary optical constructions 900 and 901, optical films 960 and 965 cover substantially the entire structured retroreflecting surface 940. In some cases, the optical films can be patterned and only cover certain portions of surface 940. For example, FIG. 4 is a schematic side-view of an optical construction 400 that includes a patterned optical film 420 that only covers portions of surface 940. In particular, optical film 420 covers, substantially conformally, portions 430 of surface 940, but does not cover and leaves exposed other portions 432 of surface 940. Optical film 420 forms a pattern on surface 940. In some cases, the pattern can be a regular pattern. In some cases, the pattern can be an irregular, such as a random, pattern. Optical film 420 promotes TIR or enhances internal reflection and can be similar to optical film 960 or 965.

Optical construction 400 also includes an optically diffusive layer 410 that is disposed on optical film 420 and uncovered portions 430. In some cases, optically diffusive layer 410 includes a plurality of particles, such as a plurality of $TiO_2$ particles, dispersed in a binder, where the index of the binder can be close to the index of refraction of retroreflecting layer 930. In such cases, optical construction can effectively retroreflect light in the covered portions 430, but not in the uncovered portions 432. Optically diffusive layer 410 can give the optical construction a white appearance in certain lighting, such as day light, conditions.

Figure 5:
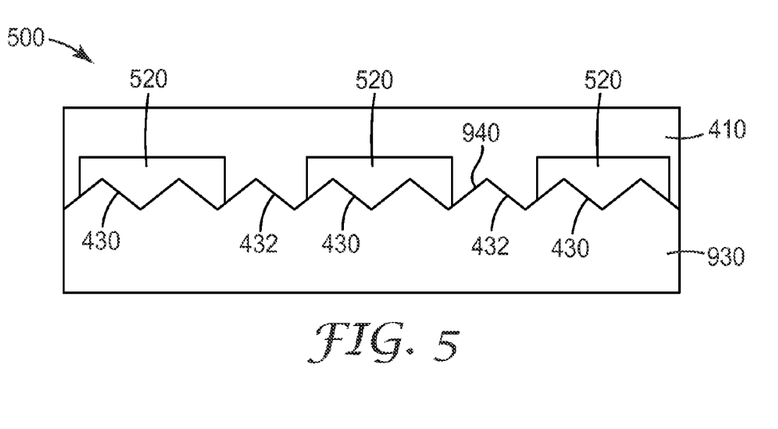
FIG. 5 is a schematic side-view of another retroreflecting optical construction.

FIG. 5 is a schematic side-view of an optical construction 500 that includes a patterned optical film 520 that only covers portions of surface 940. In particular, optical film 520 covers and substantially planarizes portions 430 of surface 940, but does not cover and leaves exposed other portions 432 of surface 940. Optical construction 500 is similar to optical construction 400 except that optical film 420 conformally covers portions 430 of surface 940, whereas optical film 520 planarizes portions 430 of surface 940.

Optical films 420 and 520 can be similar to any optical films disclosed herein. For example, optical films 420 and 520 can be similar to top optical films 960 or 965. In some cases, the percent area of portions 430 of retroreflecting surface 940 that are covered by optical film 420 or 520, is less than about 50%, or less than about 40%, or less than about 30% of the total structured area.

Particle volume concentration (PVC) and critical particle volume concentration (CPVC) can be used to characterize the porosity of a coating. When the volume concentration of the particles is larger than CPVC, the coating is porous since there is not enough binder to fill all the gaps between the particles and the interstitial regions of the coating. The coating then becomes a mixture of binder, particles and voids. The volume concentration at which this occurs is related to particle size and particle structure and/or shape. Formulations with volume concentrations above CPVC have a volume deficiency of resin in the mixture that is replaced by air. The relationship between CPVC, PVC and porosity is:

$$\text{Porosity} = 1 - \frac{CPVC}{PVC}$$

In some cases, the desirable values of CPVC for retroreflective constructions are not greater than about 60%, or not greater than about 50%, or not greater than about 40%. Particles that are highly branched or structured prevent efficient packing in the binder matrix and allow interstitial voids or pores to form. Exemplary structured and branched materials are Cabo-Sil™ fumed silicas such as EH5, TS 520, PG 002, PG 022, fumed alumina oxides such as PG003, and dispersible carbon blacks such as those available from Cabot under the trade name Vulcan™ XC72R.

The surface area, porosity and skeletal density of a nanoporous coating formulation can be determined by Braunauer, Emmett and Teller surface area analysis (the BET method). The porosity values obtained by BET can be used to determine the CPVC. The BET method is a well-known method for determining pore size, surface area and percent porosity of a solid substance.

In some cases, the desirable BET porosities for the coating of some of the disclosed optical films are in a range from about 55% to about 80%, or in a range from about 60% to about 80%, or in a range from about 65 to about 80%.

Referring back to FIG. 1A, retroreflecting optical construction 900 includes retroreflecting layer 930 that includes retroreflecting structured major surface 940. The optical construction also includes optical film 960 that is generally disposed on a first portion of the retroreflecting structured major surface. For example, the first portion can be portions 430 in FIG. 4. In some cases, the first portion is not less than about 30% of the retroreflecting structured major surface, or not less than about 35% of the retroreflecting structured major surface, or not less than about 40% of the retroreflecting structured major surface, or not less than about 45% of the retroreflecting structured major surface, or not less than about 50% of the retroreflecting structured major surface, or not less than about 55% of the retroreflecting structured major surface, or not less than about 60% of the retroreflecting structured major surface, or not less than about 65% of the retroreflecting structured major surface, or not less than about 70% of the retroreflecting structured major surface, or not less than about 75% of the retroreflecting structured major surface, or not less than about 80% of the retroreflecting structured major surface.

Optical film 960 supports TIR in the first portion of the retroreflecting structured major surface. In some cases, the first portion of the retroreflecting structured major surface exhibits a coefficient of retroreflection $R_A$ that is not less than about 50 cd/(lux·m$^2$), or not less than about 100 cd/(lux·m$^2$), or not less than about 150 cd/(lux·m$^2$), or not less than about 200 cd/(lux·m$^2$), or not less than about 250 cd/(lux·m$^2$), or not less than about 300 cd/(lux·m$^2$), or not less than about 350 cd/(lux·m$^2$), or not less than about 400 cd/(lux·m$^2$), for an observation angle of about 0.2 degrees and an entrance angle of about −4 degrees.

Total light return (TLR) for the retroreflecting optical construction 900 can be determined from a knowledge of percent active area and ray intensity. Ray intensity can be reduced by front surface losses and by reflection from each of the three cube corner surfaces for a retroreflected ray. Total light return is defined as the product of percent active area and ray intensity, or a percentage of the total incident light which is retroreflected. A discussion of total light return for directly machined cube corner arrays is described in, for example, U.S. Pat. No. 3,712,706 (Stamm). The total light return is further described in Provisional U.S. Patent Application No. 61/107,586, filed Oct. 22, 2008 incorporated herein by reference in its entirety.

In some cases, the first portion of the retroreflecting structured major surface exhibits a total light return that is not less than about 5%, or not less than about 10%, or not less than about 15%, or not less than about 20%, or not less than about 25%, or not less than about 30%, for incident visible light at an entrance angle of about −4 degrees.

Some of the advantages of the disclosed films, layers, constructions, and systems are further illustrated by the following examples. The particular materials, amounts and dimensions recited in this example, as well as other conditions and details, should not be construed to unduly limit the present invention.

Example 1

Coating solutions 1-9 were made using hydrophobic resins listed in Table I. For each coating solution, the resin and the fumed silica (available as TS-530 from Cabot Corporation, Billerica Mass.) at the weight ratio specified in Table I were mixed with the corresponding solvent also specified in Table I. The resin had a wt-part of 1. For example, for coating solution 1, the weight ratio of resin FC2145 to fumed silica was 1:5.

The resin used in coating solutions 1, 2, and 9 was Dyneon Fluoroelastomer Copolymer FC2145 (available from Dyneon LLC, Oakdale Minn.). The resin used in coating solutions 3 and 4 was SPU-5k which was a silicone polyurea formed from the reaction between an α ω aminopropyl polydiemthyl siloxane and m-tetramethyl xylene diisocyante as generally described in U.S. Pat. No. 6,355,759, Example #23. The resin used in coating solutions 5 and 6 was SR-351, a UV-polymerizable monomer (available from Sartomer Company, Exton Pa.). The resin used in coating solutions 7 and 8 was Ebecryl 8807 (EB-8807), a UV-polymerizable monomer (available from Cytec Corporation, West Paterson N.J.). Samples 5-8 were UV curable and included 1% by weight of Esacure KB-1 photoinitiator in methylethyl ketone (available from Lamberti USA, Conshohocken Pa.).

For each coating solution, the solvent was either isopropyl alcohol (IPA) or methanol (MeOH). The mixing of the resin, the fumed silica, and the solvent was done in a 300 mL stainless steel beaker. The fumed silica was dispersed in the resin using a Ross 100-LC single stage high shear mixer with a single stage slotted head rotor (available from Charles Ross and Sons, Hauppauge N.Y.) for about 3 minutes at 1200 rpm. Next, the resulting foam was allowed to settle. Next, the solid weight percentage was adjusted to 12% by adding more of the same solvent resulting in coating solutions 1-9.

Next, a coating method was developed for each coating solution. First, the coating solution was coated on a PVC Vinyl organosol substrate (available as Geon 178 from PolyOne, Avon Lake Ohio) using a round wire-rod (available as a Meyer rod from RD Specialties, Webster N.Y.), where the size of the rod is specified in Table I. The wet coating thickness was dictated by the wire-rod number. A number 30 wire-rod resulted in a wet coating thickness of approximately 75.2 microns, and a number 15 wire-rod resulted in a wet coating thickness of approximately 38.1 microns.

Coated samples 1-4 and 9 were dried at room temperature for 25 minutes. Coated samples 5-8 were cured with UV radiation using a Fusion Systems Light Hammer UV system (available from Fusion Systems Inc, Gaithersburg, Md.) that was equipped with a 500 Watt H-bulb. The coatings were cured with a single exposure at 40 feet per minute (12.3 meters per minute) which corresponded to a UV-B dose of about 49 mille-joules per square cm.

TABLE I

Formulation and coating parameters for Example 1

| Coating Solution # | Resin (wt-part = 1) | f-SiO$_2$ (wt-part) | Solvent | Coating Rod | Photo Initiator |
|---|---|---|---|---|---|
| 1 | FC2145 | 5 | MeOH | 30 | — |
| 2 | FC2145 | 5 | MeOH | 15 | — |
| 3 | SPU-5k | 5 | IPA | 30 | — |
| 4 | SPU-5k | 5 | IPA | 15 | — |
| 5 | SR-351 | 5 | IPA | 30 | 1% KB-1 |
| 6 | SR-351 | 5 | IPA | 15 | 1% KB-1 |
| 7 | EB-8807 | 5 | IPA | 30 | 1% KB-1 |

TABLE I-continued

Formulation and coating parameters for Example 1

| Coating Solution # | Resin (wt-part = 1) | f-SiO$_2$ (wt-part) | Solvent | Coating Rod | Photo Initiator |
|---|---|---|---|---|---|
| 8 | EB-8807 | 5 | IPA | 15 | 1% KB-1 |
| 9 | FC2145 | 0 | MeOH | 30 | — |

Example 2

Coating solutions 10-15 were made using hydrophilic polyvinylalcohol (available as Poval PVA-235 from Kuraray America, Houston Tex.) as specified in Table II. For each coating solution, the resin and the fumed silica (available as Cabo-O-Sperse PG002 from Cabot Corporation, Billerica Mass.) were mixed at the weight ratio specified in Table II. The resin had a wt-part of 1. For example, for coating solution 10, the weight ratio of the resin, PVA-235, to the fumed silica was 1:4. First, the PVA-235 resin was added as a 7% by weight solution in water to a stainless steel beaker equipped with an air drive mixer that was operated at a low speed to minimize foaming. Tergitol Min-Foam XL (available from Dow Chemical Company, Midland Mich.) at 1% of the weight of PVA-235, and NH$_4$OH at 2-3% of the weight of PVA-235, were added to the mixer to adjust the pH to approximately 9.5-10. Next, fumed silica was added as a 20% by weight solution in water. If needed, a sufficient quantity of CX-100, specified in Table II as a percent of the weight of the resin, was added to the mixer and the mixture was stirred until a homogenized solution was obtained. Next, deionized water was added to adjust the percentage of solids to the value specified in Table II.

Next, a coating method was developed for each coating solution. An automated notch bar coating process was used to coat each coating solution on a PVC Vinyl organosol substrate at a coating speed of 7.62 meters per second. The resulting coated sample was then dried at 65° C. for 5 minutes.

TABLE II

Formulation and coating parameters for Example 2

| Coating Solution # | Resin | PG-002 wt-part | Wt % CX100 | Final wt % Solids |
|---|---|---|---|---|
| 10 | PVA-235 | 4 | 0 | 13.5 |
| 11 | PVA-235 | 4 | 10 | 13.5 |
| 12 | PVA-235 | 6 | 0 | 15 |
| 13 | PVA-235 | 6 | 10 | 15 |
| 14 | PVA-235 | 6 | 15 | 15 |
| 15 | PVA-235 | 0 | 0 | 15 |

Example 3

Figure 6:
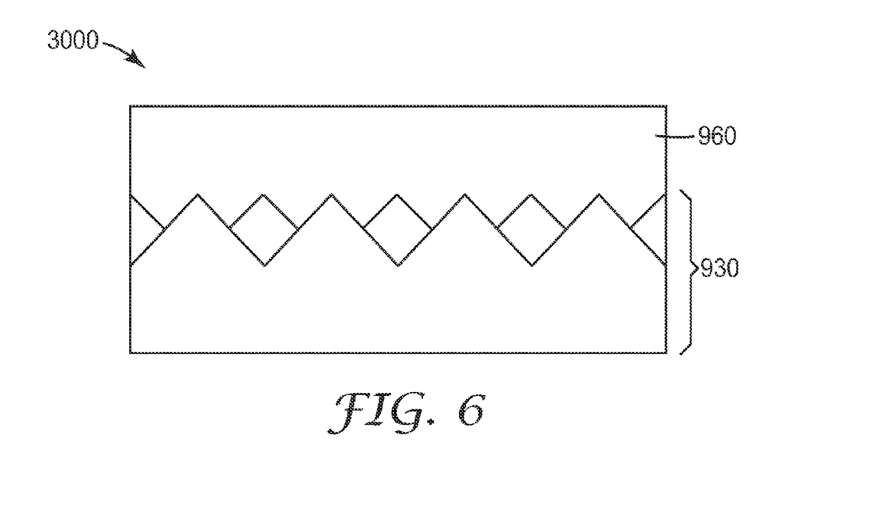
FIG. 6 is a schematic side-view of another retroreflecting optical construction.
Figure 7A:
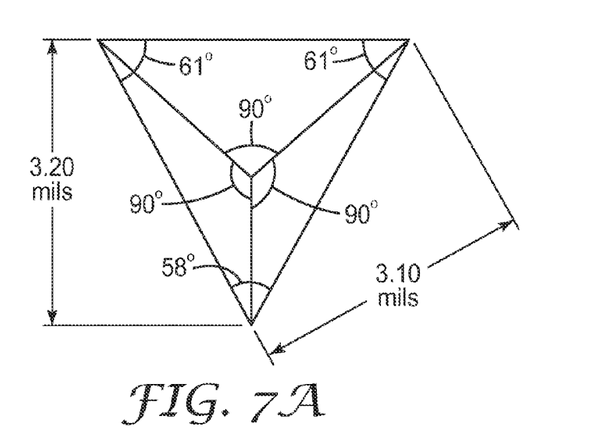
FIGS. 7A and 7B are respective schematic top-view and side-view of an individual prism in a prismatic retroreflecting layer.
Figure 7B:
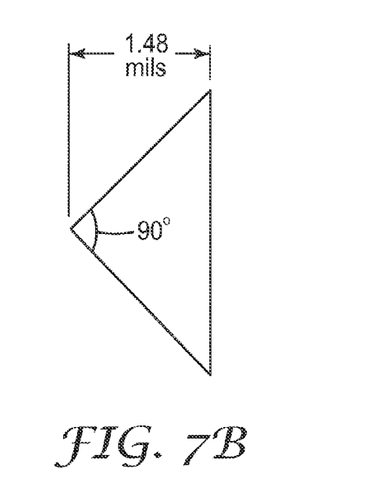

Retroreflecting optical construction 3000, a schematic side-view of which is shown in FIG. 6, was made. Optical construction 3000 was similar to a corresponding construction in FIG. 1A and included flexible prismatic retroreflecting layer 930 and optical film 960 coated on the retroreflecting layer. The optical film substantially planarized the structured side of the retroreflecting layer. FIGS. 7A and 7B are respective schematic top-view and side-view of an individual prism in the prismatic retroreflecting layer. The angles in FIGS. 7A and 7B are in degrees, and the dimensions are in mils. Each facet of a prism in the retroreflecting layer was a right angled triangle and the base was an isosceles triangle. The prisms were made using the methods generally described in, for example, U.S. Pat. Nos. 6,843,571 and 5,691,846, the disclosures of which are incorporated in their entireties herein by reference.

Retroreflecting optical constructions 1-9, similar to construction 3000, were made following the procedure described in Example 2. Constructions 1-9 corresponded to respective samples 1-9 made in Example 2. Construction "A" was the prismatic retroreflecting layer with no coating (that is, layer 960 was air).

Coefficient of retroreflection $R_A$ in units of cd/(lux·m$^2$) were measured for the constructions according to ASTM E-810 test method at 0.2 degree observation angle and −4 degrees entrance angle, and at 0.2 degree observation angle and 30 degrees entrance angle. The measurements were taken for two orthogonal prism orientations. The measured results for $R_A$ are summarized in Table III.

TABLE III

Retroreflective properties of samples in Example 3

| Construction No. | Observation Angle: 0.2° Entrance Angle: −4° | | Observation Angle: 0.2° Entrance Angle: 30° | |
|---|---|---|---|---|
| | Film Orientation (Degrees) | | | |
| | 0 | 90 | 0 | 90 |
| 1 | 363 | 355 | 54 | 57 |
| 2 | 304 | 287 | 53 | 33 |
| 3 | 199 | 200 | 20 | 27 |
| 4 | 294 | 273 | 32 | 23 |
| 5 | 234 | 214 | 30 | 25 |
| 6 | 174 | 160 | 20 | 18 |
| 7 | 272 | 256 | 37 | 30 |
| 8 | 273 | 254 | 41 | 28 |
| 9 | 0.1 | 0.1 | 0.3 | 0.4 |
| A | 571 | 574 | 69 | 52 |

Example 4

Retroreflecting optical constructions 10-15, similar to construction 3000, were made following the procedure described in Example 2. Constructions 10-15 corresponded to respective samples 10-15 made in Example 2. Construction "B" was the prismatic retroreflecting layer with no coating (that is, layer 960 was air).

Coefficient of retroreflection $R_A$ in units of cd/(lux·m$^2$) were measured for the optical constructions at 0.2 degree observation angle and −4 degrees entrance angle, and at 0.2 degree observation angle and 40 degrees entrance angle. The measurements were taken for two orthogonal prism orientations. The measured results for $R_A$ are summarized in Table IV.

TABLE IV

Retroreflective properties of samples in Example 4

| Construction No. | Observation Angle: 0.2° Entrance Angle: −4° | | Observation Angle: 0.2° Entrance Angle: 40° | |
|---|---|---|---|---|
| | Film Orientation (degrees) | | | |
| | 0 | 90 | 0 | 90 |
| 10 | 324 | 320 | 28.1 | 14.2 |
| 11 | 322 | 318 | 22.8 | 15 |
| 12 | 363 | 356 | 30 | 16.8 |
| 13 | 336 | 335 | 21.5 | 18.9 |
| 14 | 297 | 283 | 11.6 | 11.5 |

TABLE IV-continued

Retroreflective properties of samples in Example 4

| Construction | Observation Angle: 0.2° Entrance Angle: −4° Film Orientation (degrees) | | Observation Angle: 0.2° Entrance Angle: 40° Film Orientation (degrees) | |
|---|---|---|---|---|
| No. | 0 | 90 | 0 | 90 |
| 15 | 0.1 | 0.1 | 0.1 | 0.1 |
| B | 571 | 574 | 29 | 17 |

Example 5

Figure 8A:
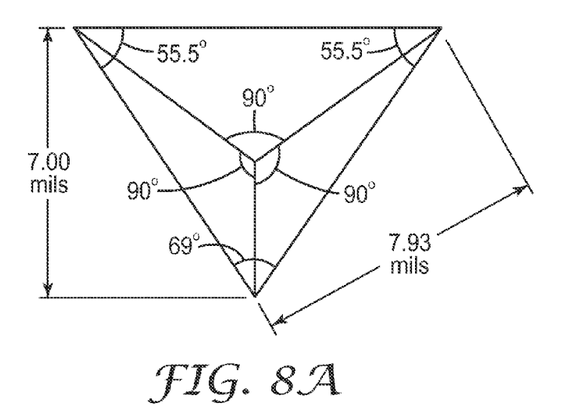
FIGS. 8A and 8B are respective schematic top-view and side-view of an individual prism in another prismatic retroreflecting layer.
Figure 8B:
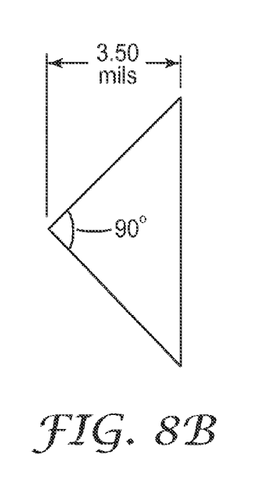

Retroreflecting optical constructions 3000 were made. Prismatic retroreflecting layer 930 was rigid and made using the methods generally described in, for example, U.S. Pat. No. 6,884,371, the disclosure of which is incorporated in its entirety herein by reference. The optical film substantially planarized the structured side of the retroreflecting layer. FIGS. 8A and 8B are respective schematic top-view and side-view of an individual prism in the prismatic retroreflecting layer. The angles in FIGS. 8A and 8B are in degrees, and the dimensions are in mils. The facets of the prisms were right angled triangles and the bases were isosceles triangles.

Retroreflecting optical constructions 1-7, similar to construction 3000, were made following the procedure described in Example 1. Constructions 1-6 corresponded to respective samples 1-6 made in Example 1. Optical construction 7 corresponded to sample 9 in Example 1. Construction "C" was the prismatic retroreflecting layer with no coating (that is, layer 960 was air).

Coefficient of retroreflection $R_A$ in units of cd/(lux·m$^2$) were measured at 0.2 degree observation angle and −4 degrees entrance angle, and at 0.2 degree observation angle and 30 degrees entrance angle. The measurements were taken for two orthogonal prism orientations. The measured results for $R_A$ are summarized in Table V.

TABLE V

Retroreflective properties of samples in Example 5

| Construction | Observation Angle: 0.2° Entrance Angle: −4° Film Orientation (Degrees) | | Observation Angle: 0.2° Entrance Angle: 30° Film Orientation (Degrees) | |
|---|---|---|---|---|
| No. | 0 | 90 | 0 | 90 |
| 1 | 520 | 587 | 136 | 208 |
| 2 | 1092 | 1180 | 380 | 426 |
| 3 | 1220 | 1260 | 399 | 467 |
| 4 | 1228 | 1244 | 399 | 424 |
| 5 | 448 | 610 | 102 | 204 |
| 6 | 315 | 338 | 62 | 129 |
| 7 | 15 | 19 | 30 | 30 |
| C | 1260 | 903 | 644 | 605 |

Example 6

Retroreflecting optical construction 3000, a schematic side-view of which is shown in FIG. 6, was made. Optical construction 3000 was similar to a corresponding construction in FIG. 1A and included flexible prismatic retroreflecting layer 930 and optical film 960 coated on the retroreflecting layer. The optical film substantially planarized the structured side of the retroreflecting layer. FIGS. 7A and 7B are respective schematic top-view and side-view of an individual prism in the prismatic retroreflecting layer. The angles in FIGS. 7A and 7B are in degrees, and the dimensions are in mils. Each facet of a prism in the retroreflecting layer was a right angled triangle and the base was an isosceles triangle. The prisms were made using the methods generally described in, for example, U.S. Pat. Nos. 6,843,571 and 5,691,846.

First, a coating solution was made. In a 2 liter three-neck flask, equipped with a condenser and a thermometer, 960 grams of IPA-ST-UP organosilica elongated particles (available from Nissan Chemical Inc., Houston, Tex.), 19.2 grams of deionized water, and 350 grams of 1-methoxy-2-propanol were mixed under rapid stirring. The elongated particles had a diameter in a range from about 9 nm to about 15 nm and a length in a range from about 40 nm to about 100 nm. The particles were dispersed in a 15.2% wt IPA. Next, 22.8 grams of Silquest A-174 silane (available from GE Advanced Materials, Wilton, Conn.) was added to the flask. The resulting mixture was stirred for 30 minutes.

The mixture was then kept at 81° C. for 16 hours. Next, the solution was allowed to cool down to room temperature. Next, about 950 grams of the solvent in the solution were removed using a rotary evaporator under a 40° C. water-bath, resulting in a 41.7% wt A-174-modified elongated silica clear dispersion in 1-methoxy-2-propanol.

Next, 407 grams of this clear dispersion, 165.7 grams of SR 444 (available from Sartomer Company, Exton, Pa.), 8.28 grams of photoinitiator Irgacure 184 and 0.828 grams of photoinitiator Irgacure 819 (both available from Ciba Specialty Chemicals Company, High Point N.C.), and 258.6 grams of isopropyl alcohol were mixed together and stirred resulting in a homogenous coating solution of 40% solids.

Next, a coating method was developed for the coating solution. Approximately 1 ml of the 40% solids coating solution was applied to the flexible prismatic retroreflecting layer. A 1.0 mil thick SBOPP (simultaneously biaxially oriented polypropylene) liner was hand laminated onto the solution to create a uniform layer of coating solution. The liner was slightly above the peaks of the corner cubes. Next, the sample was cured in a single exposure by passing the sample through a belt-fed ultra-violet lamp system (available from RPC industries, Plainfield, Ill.) fitted with two 200 Watt medium pressure Hg bulbs, at 50 fpm, yielding a UVA dose of 300 mJ/cm$^2$ in air. The samples were then removed from the chamber, the SBOPP liner was removed, and the sample was placed in a 120° F. oven for about 10 minutes to dry.

Coefficient of retroreflection $R_A$ in units of cd/(lux·m$^2$) were measured for the constructions according to ASTM E-810 test method at 0.2 degree observation angle and −4 degrees entrance angle, and at 0.2 degree observation angle and 30 degrees entrance angle. The measurements were taken for two orthogonal prism orientations. The measured results for $R_A$ are summarized in Table VI.

TABLE VI

Retroreflective properties of samples in Example 6

| Construction | Observation Angle: 0.2° Entrance Angle: −4° Film Orientation (Degrees) | | Observation Angle: 0.2° Entrance Angle: 30° Film Orientation (Degrees) | |
|---|---|---|---|---|
| No. | 0 | 90 | 0 | 90 |
| Example 6 | 99.6 | 101 | 6 | 4 |

Example 7

A 25 g solution of the coating formulation 12 described in Example 2 was dried at 50° C. in a 200 ml beaker. The dried formulation was collected and ground into a fine powder with a ceramic motor and pestle and was dried further at 80° C. for 16 hrs. The solid powder was then submitted for BET analysis along with control samples CE-A, CE-B and CE-C prepared in a similar manner. Control sample CE-A was made using Poly(methylmethacrylate)-Cabot TS 530 f-SiO$_2$ mixture (PMMA-Si 1:5, where the PMMA was obtained from Aldrich Chemicals and the mixture was dried from 15% solids in MEK instead of water). Control sample CE-B was made from a PMMA-NALCO 2327 1:5 by weight mixture (Nalco 2327 was a non-porous 20 nm colloidal silica dispersion available from Rohm and Haas of Philadelphia, Pa.). Control sample CE-C was made from Cabot TS 530 f-SiO$_2$ with no resin. The BET data are shown in Table VII.

The surface area, porosity and skeletal density of the dried coating formulations were measured by means of a Quantachrome Autosorb 1 BET analyzer (available from Quantachrome Instruments of Boynton Beach. Fl). The samples were subjected to a 40 point analysis to determine their surface area and pore size distribution. The BET method of surface area analysis (due to Braunauer, Emmett and Teller) was used to determine pore size, surface area and percent for each of the samples.

TABLE VII

Pore volume, pore fraction and surface area for samples of Example 7

| Sample | Mixture | Pore Volume (cc/g) | Pore Fraction (NLDF) | Surface Area m$^2$/g |
|---|---|---|---|---|
| 12 | 1:6 PVA-Si | 0.86 | 63% | 107 |
| CE-A | 1:5 PMMA-Si | 0.953 | 65% | 118 |
| CE-B | 1:5 PMMA-collodial silica (non-porous silica) | 0.098 | 16% | 11 |

As used herein, terms such as "vertical", "horizontal", "above", "below", "left", "right", "upper" and "lower", "clockwise" and "counter clockwise" and other similar terms, refer to relative positions as shown in the figures. In general, a physical embodiment can have a different orientation, and in that case, the terms are intended to refer to relative positions modified to the actual orientation of the device. For example, even if optical construction 900 in FIG. 1A is flipped as compared to the orientation in the figure, major surface 923 is still considered to be a "top" major surface.

All patents, patent applications, and other publications cited above are incorporated by reference into this document as if reproduced in full. While specific examples of the invention are described in detail above to facilitate explanation of various aspects of the invention, it should be understood that the intention is not to limit the invention to the specifics of the examples. Rather, the intention is to cover all modifications, embodiments, and alternatives falling within the spirit and scope of the invention as defined by the appended claims.

What is claimed is:

1. A retroreflecting optical construction, comprising:
    a retroreflecting layer having a retroreflecting structured major surface;
    an optical film disposed on the retroreflecting structured major surface and having an effective index of refraction that is not greater than about 1.3.

2. The retroreflecting optical construction of claim 1, wherein the retroreflecting structured major surface includes a plurality of pyramidal structures.

3. The retroreflecting optical construction of claim 2, wherein the plurality of pyramidal structures comprises a plurality of cube corners.

4. The retroreflecting optical construction of claim 1, wherein the optical film has an effective index of refraction that is not greater than about 1.25.

5. The retroreflecting optical construction of claim 1, wherein at least 50% of each two neighboring major surfaces in the retroreflecting optical construction are in physical contact with each other.

6. The retroreflecting optical construction of claim 1, wherein the optical film substantially planarizes the retroreflecting layer.

7. The retroreflecting optical construction of claim 1 further comprising an optical adhesive layer disposed between the optical film and the optically diffusive layer.

8. The retroreflecting optical construction of claim 1 further comprising a substrate disposed on the optically diffusive layer.

9. The retroreflecting optical construction of claim 8, wherein the substrate comprises a metal plate.

10. The retroreflecting optical construction of claim 1 further comprising a graphics layer disposed on the retroreflecting layer opposite the optical film.

11. The retroreflecting optical construction of claim 10, wherein the graphics layer is optically transmissive.

12. The retroreflecting optical construction of claim 1, wherein the optical film comprises a binder, a plurality of particles and a plurality of interconnected voids, wherein a volume fraction of the plurality of interconnected voids in the optical film is not less than about 20%, and wherein a weight ratio of the binder to the plurality of the particles is not less than about 1:1.

13. The retroreflecting optical construction of claim 12, wherein the volume fraction of the plurality of interconnected voids in the optical film is not less than about 50%.

14. The retroreflecting optical construction of claim 12, wherein the weight ratio of the binder to the plurality of the particles is not less than about 2:1.

15. The retroreflecting optical construction of claim 12, wherein the plurality of particles comprises elongated particles.

16. The retroreflecting optical construction of claim 12, wherein the plurality of particles includes fumed silica particles and the weight ratio of the binder to the fumed silica particles is less than about 1:1.

17. The retroreflecting optical construction of claim 12, wherein the plurality of particles includes fumed silica particles and the weight ratio of the binder to the fumed silica particles is between about 1:2 and about 1:6.

18. The retroreflecting optical construction of claim 1, further including an optically diffusive layer disposed on the optical film.

19. The retroreflecting optical construction of claim 1, wherein the optically diffusive layer is an optical adhesive.

* * * * *

UNITED STATES PATENT AND TRADEMARK OFFICE
CERTIFICATE OF CORRECTION

PATENT NO. : 9,291,752 B2  
APPLICATION NO. : 13/970260  
DATED : March 22, 2016  
INVENTOR(S) : William D. Coggio et al.

Page 1 of 1

It is certified that error appears in the above-identified patent and that said Letters Patent is hereby corrected as shown below:

<u>Title Page,</u>
Item 62 and 60, Related U.S. Application Data, should read
--(62) Division of application No. 12/760,738, filed April 15, 2010, now Pat. No. 8,534,849.
(60) Provisional application No. 61/169,532, filed on April 15, 2009.--

Signed and Sealed this
Seventeenth Day of May, 2016

Michelle K. Lee
*Director of the United States Patent and Trademark Office*